Nov. 9, 1965   J. B. WALLENIUS   3,216,353
BENDABLE THERMOPLASTIC PRINTING PLATES
Filed Oct. 25, 1962   2 Sheets-Sheet 1
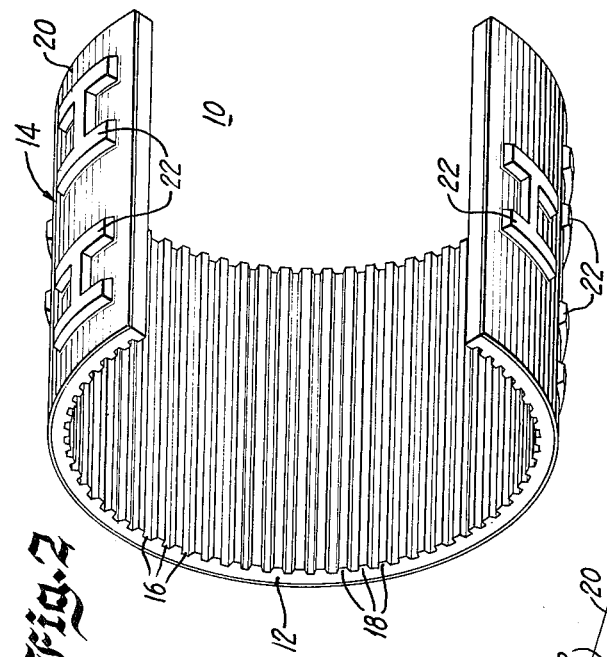
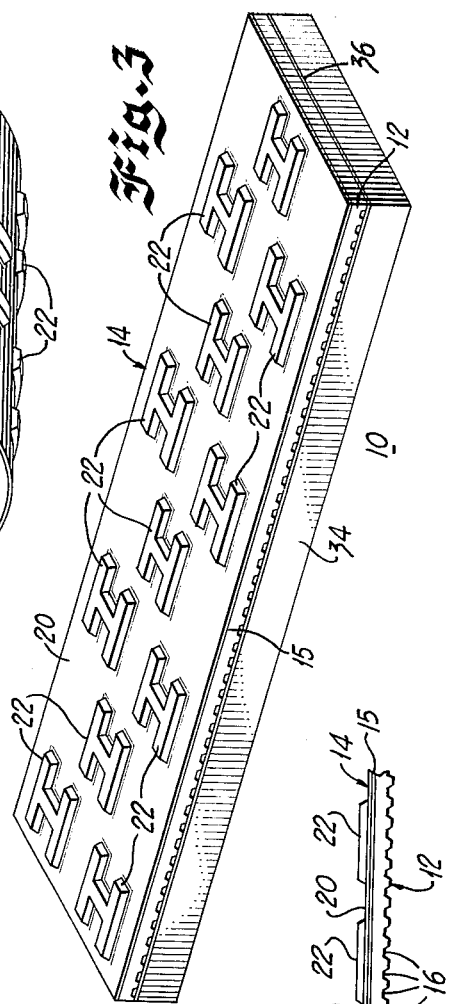
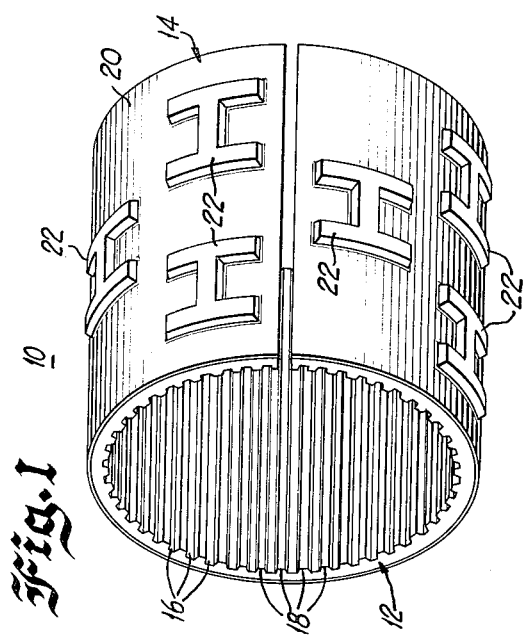
INVENTOR.
JOHAN BENJAMIN WALLENIUS

INVENTOR.
JOHAN BENJAMIN WALLENIUS

United States Patent Office 3,216,353
Patented Nov. 9, 1965

3,216,353
BENDABLE THERMOPLASTIC PRINTING
PLATES
Johan Benjamin Wallenius, Elmwood Park, Ill.
(Siltasaarenkatu 15, A29, Helsinki, Finland)
Filed Oct. 25, 1962, Ser. No. 233,067
6 Claims. (Cl. 101—395)

The present invention relates to printing plates and has for its primary object the provision of a new and improved flexible or bendable printing plate, and method of making same, that can readily be used both on flat printing blocks and printing cylinders.

A further object of the present invention is to provide a new and improved permanently curvable, shrinkage controlled rubber printing plate that can be made readily and economically and easily assembled on flat or rotary printing plates and cylinders.

Printing plates that are available at the present time and intended for use on printing cylinders are produced by a flat plate making method and, when applied to printing cylinders, internal stresses in the plates frequently cause popping of the edges of the plates in use. Also, in application to the cylinder some stretching of the external or printing surface of the plate and contraction at the inner or back surface occurs during the bending of the plates for assembly on the cylinder. The result is distortion in the print designs, such for example as making a circular letter O into an oval shape.

Printing plates made in accordance with the present invention are made entirely of non-metallic materials and possess many advantageous properties not heretofore found in rubber printing plates. They are the extremely light weight, accurately controlled thickness, dimensional stability (as required for color registration), self-gripping action on wrap around or cylindrical plates, and the property of being reflattened, recurved or modified as to shape an unlimited number of times by quick reheating with a minimum of distortion of printing design.

In brief, the printing plate of the present invention comprises a relatively thick backing plate of fibrous cellulose. The backing plate is impregnated with a thermoplastic and phenol, the thermoplastic being a polyvinyl acetate emulsion, with the result that its shape can be formed into desired shape. Also, with the application of heat it may be shaped and reshaped any number of times. The printing plate includes also a flexible cured rubber printing element flexibily secured to the backing plate. The rubber printing element may be one of a plurality of pieces placed where desired on the backing plate and the element may be secured flexibly to the back plate as by a suitable adhesive. The backing plate is grooved on its back side thereby the facilitate shaping and assembly of the printing plate and to enhance its dimensional stability and accuracy.

Other objects and advantages of the present invention will become apparent from the ensuing description of an illustrative embodiment thereof in the course of which reference is had to the accompanying drawings in which:

FIG. 1 is a perspective view of a printing plate constructed in accordance with the present invention curved as for wrap around installation on a rotatable printing cylinder;

FIG. 2 is a perspective view of the plate of FIG. 1 opened somewhat in readiness for installation on a printing cylinder;

FIG. 3 is a perspective view of the plate in a flattened condition installed upon a flat printing block;

FIG. 4 is a reduced fragmentary side elevational view of a flat printing plate;

Figure 5:
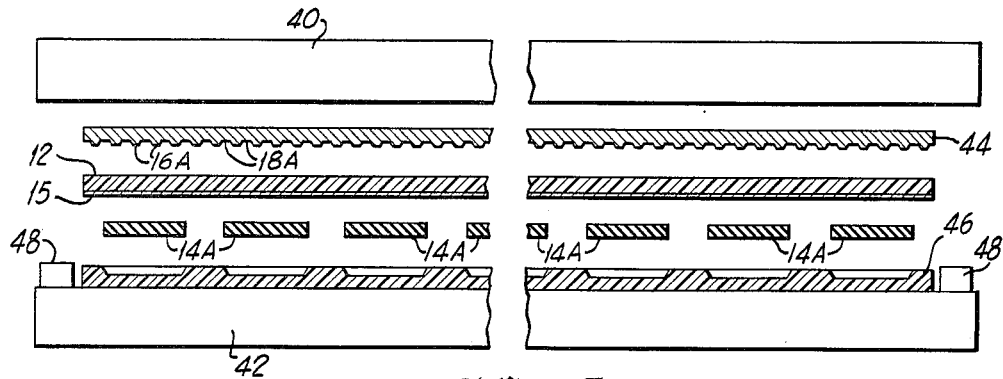
FIG. 5 is an exploded and diagrammatic view of the printing plate components and apparatus used in manufacture of the plate.

Referring now to the drawings and first to FIGS. 1, 2 and 4, a printing plate of the present invention is illustrated and indicated generally by the reference character 10. It includes a relatively thick backing element 12 and a printing element 14 that is secured to the backing element as by a layer 15 of cement. The backing element is provided with a number of grooves 16 extending crosswise of the plate relative to the printing direction and defining spaced ridges 18. The printing element is made of molded rubber and, as illustrated, it may include a relatively thin portion 20 and the relatively thicker portion 22 configured in accordance with the desired printed matter. As illustrated, the thicker portions 22 define the letter H. It may be well to note at this point that the printing element may be made in spaced portions located in accordance with the printed matter. This would result in a saving of material and cost over that provided by the relatively thin portion 20 extending over the area of the plate.

Figure 7:
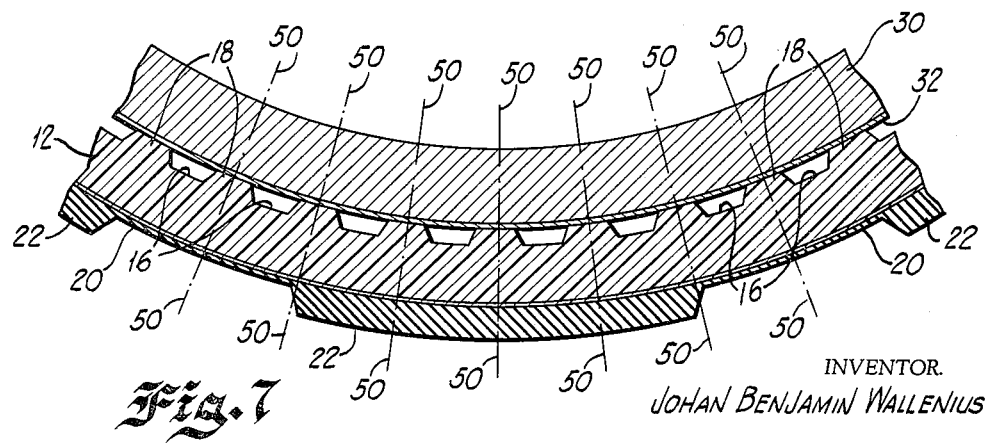
FIG. 7 is an enlarged fragmentary cross sectional view of the printing plate, such as that of FIG. 1, assembled and secured to a printing cylinder.

The printing plate may readily be curved for assembly on a printing cylinder, such as the cylinder 30 shown fragmentarily in FIG. 7, the plate being suitably secured to the cylinder by securing means, such as clamping means, adhesive, or an adhesive fabric strip 32 that is shown. The plate, which is initially made flat, is prepared for mounting on the cylinder by curving it, as shown in FIG. 1, and then opening it, as shown in FIG. 2, prior to placement on the cylinder. The flat plate is curved into the configuration of FIG. 1 by heating and curving—the curvature being applied until the plate cools.

The printing plate 10 may readily be used on a flat printing plate as shown in FIG. 3 where it is secured to plate 34 as by an adhesive fabric strip 36. If initially made flat, then it can be readily applied to a flat plate 34. If curved, then it can be flattened by the application of heat—no pressure being required although it should be held flat in cooling.

Figure 6:
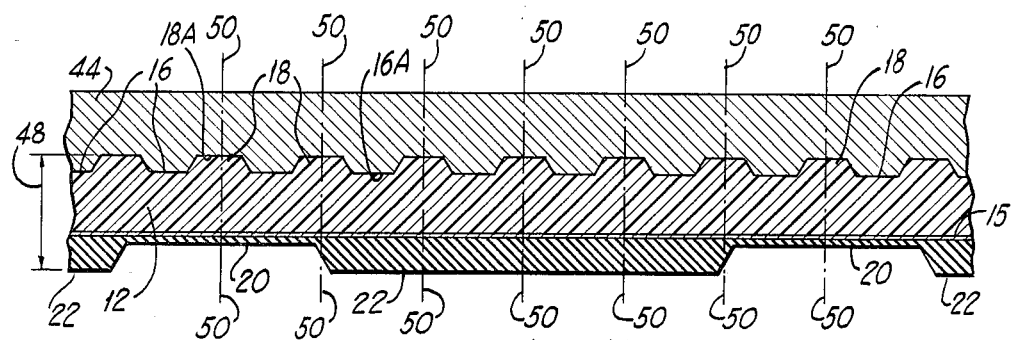
FIG. 6 is an enlarged fragmentary cross sectional view showing a portion of the apparatus used in manufacture of the printing plate and with full pressure applied.

The printing plate can be readily made and formed into desired shape not only for initial but subsequent use or storage. It is preferably made flat, as shown in conjunction with FIGS. 5 and 6, to which reference is now had.

In manufacture of the plate, a pair of heated press platens 40 and 42 are utilized, as is a groove and ridge forming plate 44 that is, for convenience of manufacture, made as a separate element. The platens 40 and 42 are illustrated diagrammatically and are of known manufacture. The plate 44 is provided with grooves 18A and ridges 16A to form the grooves 16 and ridges 18 in the printing plate backing element 12. The grooves are crosswise of the printing element in order that bending of the plate be facilitated, that internal stresses be removed from the final plate, and that closely held dimensional tolerances result.

In manufacture, the plate 44 is placed between the platens, with its smooth side adjacent one of the platens, preferably the upper one 40. It overlies the backing element 12, underneath which is located an adhesive layer 15. Underneath the adhesive are pieces 14A of unvulcanized rubber, these being located at position correspondinging to where the printing protuberances are desired, i.e., at locations of the letters H. The pieces 14A have sufficient volume that they provide not only the letters 22 but also the thinner intermediate portions 20, although they need not provide the latter completely, particularly if there should be considerable spacing between the letters.

The printing mold, of Bakelite or other suitable material and made in accordance with conventional practice, is indicated by the reference character 46. It is between the unvulcanized rubber pieces 14A and the lower platen 42. If desired, the movement of the press plates toward each other, and the thickness of the printing plates, may be accurately determined by providing control bars 48 between the platens.

In manufacture, the materials are preheated in the press for about 2 minutes to a temperature of about 300° F. The platens are then slowly pressed toward each other. The rubber chunks 14A are vulcanized and formed into the portions 20 and 22, the grooves 16 and ridges 18 are formed in the back plate, and the printing and back elements are securely fastened together. The vulcanization may take place at a temperature of about 300° F. and for a period of about ten minutes.

For the manufacture of a printing element that may be used readily upon a printing cylinder having a diameter of about six to ten inches, it has been found desirable to have the grooves 16 spaced apart about seventy-six thousandths of an inch (about thirteen grooves and thus ridges per inch) and of a depth of about fifteen thousandths of an inch for a backing plate having a thickness of about sixty thousandths and used with a rubber plate of a thickness of about forty to fifty thousands of an inch. Also, the grooves are slightly tapered as illustrated best in FIGS. 6 and 7. Placement of the grooves in the backing plate not only facilitates bending of the resulting printing plate but provides an effective control for the thickness of the printing plate, there being some compression of the printing plate at the regions of the grooves. The grooves should not be too deep. If too deep, the backing plate material would not be formed to an even height at the tops of the ridges. There would not be enough material to engage the bottoms of the grooves in forming plate 44. Also, there would be some danger of rupturing or weakening the backing plate.

After a plate has been once formed, its shape may be changed as from cylindrical to flat or vice-versa by reheating followed by the curving or changing shape. Reheating can be effected at between 300° to 400° F. for a period of about two minutes. In bending, the ridged backing construction enables the plate readily to be bent with substantially no or at least very little resistance against curvature, the lines 50—50 in FIGS. 6 and 7 indicating the adjacent units or structure that constitute what might be called yieldable or bendable units. The fibres at the bottoms of the grooves 16 are compressed, but not broken. This feature contributes to the bendability without cracking of the backing element. It also provides for even bending or curvature.

One of the features of the present invention is in the construction of the backing element. It is made of fibrous cellulose material and preferably one that is inexpensive and readily obtainable. It has been found that a dry cellulose felt is very well suited. A felt that has been found satisfactory is one used in the manufacture of roofing. In preparing it for use in the manufacture of the printing plate as described above it can be treated as follows:

The felt is first saturated in a solution comprising 35% polyvinyl acetate emulsion and 65% water. The fibrous felt is soaked in the solution for two or three minutes in order to thoroughly saturate it. Excessive emulsion is then removed from the felt as by passing it lightly through rolls or lightly squeezing it by rolling it on a flat table. The felt is then dried from eight to twelve hours or in a shorter period of time if the drying is expedited by forced warm air circulation.

The thus treated felt is then soaked in a second solution consisting of about 92% anhydrous alcohol and about 8% phenolic resin. The soaking can be effected in a couple of minutes after which the excess is squeezed off and the felt dried which normally occurs in two to three hours.

The surface of the dried felt to which the printing plate is to be attached is then covered with a rubber cement. A cement that has been found satisfactory is made as follows:

First, 85% toluol is mixed with 25% unvulcanized rubber.

Second, 80% acetone is mixed with 20% celluloid solid.

The two foregoing mixtures are then mixed together in the ratio of 80% to 20%. The result is a cement that dries quickly and forms an adhesive surface which effectively holds the rubber printing element.

The back surface of the fibrous felt, i.e., the surface to be grooved is treated by brushing it with a solution containing 90% water and 10% polyvinyl alcohol granules. After brushing the back surface is permitted to dry for an hour or so. The felt is then ready for storage in a dry place until it is to be used or it can be immediately used for making the rubber printing plate of the invention.

The backing element prepared in either of the aforementioned ways is then utilized in construction of the backing plate as described above in conjunction with FIGS. 5 and 6.

A printing plate made in accordance with the present invention may be made both simply and economically. It represents a considerable saving costwise, of about forty to seventy percent, over known types of rubber printing plates. The printing plate uses much less rubber than ordinarily used and it can readily be made in printing establishments with available equipment. The plates can be made for flat or cylindrical printing and after use on the latter may be flattened for convenient storage.

While the present invention has been described with illustrative embodiments, the details thereof are not intended to be limitative of the invention except insofar as set forth in the accompanying claims.

What is claimed as new and desired to be secured by Letters Patent of the United States is:

1. A printing plate, including in combination, a backing plate of fibrous cellulose felt impregnated with a thermoplastic and penolic resin such that the felt permanently remains thermoplastic, and a flexible cured rubber printing element flexibly secured to said backing plate.

2. A printing plate as claimed in claim 1 wherein the backing plate has its back side grooved crosswise to the printing direction to facilitate mounting on a rotary printing plate.

3. A printing plate as claimed in claim 2 wherein the grooves are relatively shallow and formed by compression of the backing plate material.

4. A printing plate as claimed in claim 1 wherein the rubber printing element is thin relative to the backing plate.

5. A printing plate comprising a fibrous backing plate and a flexible printing element, said printing element being secured to said backing plate, said backing plate being impregnated with a thermoplastic resin, the back side of said backing plate being grooved compressionally, the depth of each said grooves being approximately one-quarter of the thickness of said backing plate, and the average width of each groove being approximately equal to the thickness of said backing plate.

6. A printing plate as claimed in claim 5 wherein said printing element is a relatively thin rubber printing element secured to the side of the backing plate opposite the grooves.

References Cited by the Examiner

UNITED STATES PATENTS

| | | | |
|---|---|---|---|
| 1,098,610 | 6/14 | Aylesworth | 101—395 |
| 1,401,633 | 12/21 | Novotny | 101—395 |
| 1,442,338 | 1/23 | Herr. | |
| 1,810,089 | 6/31 | Schmutz | 101—401.1 |
| 2,040,377 | 5/36 | Harley | 101—395 |
| 2,048,631 | 7/36 | Motson | 101—395 |
| 2,099,154 | 11/37 | Waters | 101—379 |
| 2,330,002 | 9/43 | Moss et al. | 101—401.1 |
| 2,388,878 | 11/45 | Spelker | 101—401.3 |
| 2,517,701 | 8/50 | Oettinger. | |

FOREIGN PATENTS

| | | |
|---|---|---|
| 151,299 | 9/20 | Great Britain. |

WILLIAM B. PENN, *Primary Examiner.*

ROBERT A. LEIGHEY, DAVID KLEIN, *Examiners.*